(12) United States Patent
Jakobsson et al.

(10) Patent No.: US 11,064,054 B1
(45) Date of Patent: *Jul. 13, 2021

(54) METHOD AND APPARATUS FOR STORING INFORMATION IN A BROWSER STORAGE AREA OF A CLIENT DEVICE

(71) Applicant: RavenWhite Security, Inc., Menlo Park, CA (US)

(72) Inventors: Bjorn Markus Jakobsson, Portola Valley, CA (US); Ari Juels, Brookline, MA (US)

(73) Assignee: RavenWhite Security, Inc, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,681

(22) Filed: Jan. 30, 2020

Related U.S. Application Data

(63) Continuation of application No. 15/706,556, filed on Sep. 15, 2017, now Pat. No. 10,594,823, which is a
(Continued)

(51) Int. Cl.
*H04L 29/06* (2006.01)
*H04L 29/08* (2006.01)
(Continued)

(52) U.S. Cl.
CPC .......... *H04L 67/42* (2013.01); *G06F 16/9566* (2019.01); *G06F 16/9574* (2019.01);
(Continued)

(58) Field of Classification Search
CPC ......... G06F 17/30887; G06F 17/30902; H04L 65/00–65/80; H04L 41/00–41/32; H04L 67/00–67/42; H04L 63/08–63/015
See application file for complete search history.

(56) References Cited

U.S. PATENT DOCUMENTS 4,691,299 A 9/1987 Rivest
6,314,492 B1 11/2001 Allen
(Continued)

OTHER PUBLICATIONS

Agarwal, R. et al., "Privacy-Preserving Data Mining", ACM SIGMOD Conference on Management of Data (2000), ACM Press, pp. 439-450.
(Continued)

*Primary Examiner* — Clayton R Williams
(74) *Attorney, Agent, or Firm* — Van Pelt, Yi & James LLP

(57) ABSTRACT

Disclosed is a method and apparatus for performing steps to cause encoded information to be stored at a client device during a first network session between a server and the client device. To cause encoded information to be stored at a client device, the server first determines a set of network resource requests that encode the information. These network resource requests may include requests for one or more specific URLs and/or requests for one or more files. The server then causes the client device to initiate the network resource requests. The server may cause this initiation by, for example, redirecting the client device to the network resources. The client device initiating the network resource requests causes data representative of the network resource requests to be stored at the client device.

21 Claims, 4 Drawing Sheets

Related U.S. Application Data continuation of application No. 14/560,906, filed on Dec. 4, 2014, now Pat. No. 10,659,551, which is a continuation of application No. 13/964,988, filed on Aug. 12, 2013, now Pat. No. 8,930,549, which is a continuation of application No. 11/590,083, filed on Oct. 31, 2006, now Pat. No. 8,533,350.

(60) Provisional application No. 60/732,025, filed on Nov. 1, 2005.

(51) Int. Cl.
    *G06F 16/955* (2019.01)
    *G06F 16/957* (2019.01)

(52) U.S. Cl.
    CPC .......... *H04L 63/0807* (2013.01); *H04L 67/02* (2013.01); *H04L 67/2842* (2013.01)

(56) References Cited

U.S. PATENT DOCUMENTS

| | | | |
|---|---|---|---|
| 6,405,239 | B1 | 6/2002 | Addington |
| 6,687,792 | B2 | 2/2004 | Beyda |
| 7,107,535 | B2 | 9/2006 | Cohen |
| 7,200,665 | B2 | 4/2007 | Eshghi |
| 7,237,118 | B2 | 6/2007 | Himberger |
| 10,163,130 | B2 * | 12/2018 | Shariat .................... H04L 67/22 |
| 2002/0164058 | A1 | 11/2002 | Aggarwal |
| 2004/0003351 | A1 | 1/2004 | Sommerer |
| 2004/0024881 | A1 * | 2/2004 | Elving ................ H04L 67/1002 709/227 |
| 2004/0073566 | A1 | 4/2004 | Trivedi |
| 2004/0111621 | A1 | 6/2004 | Himberger |
| 2004/0181598 | A1 * | 9/2004 | Paya .................... G06F 16/9574 709/227 |
| 2004/0260651 | A1 | 12/2004 | Chan |
| 2005/0022203 | A1 | 1/2005 | Zisapel |
| 2005/0235155 | A1 * | 10/2005 | Lopatin .................... H04L 29/06 713/182 |
| 2005/0240940 | A1 * | 10/2005 | Quinet .................... H04L 29/06 719/315 |
| 2006/0056618 | A1 | 3/2006 | Aggarwal |

OTHER PUBLICATIONS

Christopher Kings-Lynne, "Implementing Cross-Domain Cookies", Nov. 29, 2000, Phpbuilder, pp. 1-6 (Year: 2000).

Clover's, "Timing Attacks on Web Privacy", Report of Feb. 20, 2002, referenced 2006 at http://www.securiteam.com/securityreviews/5GP020A6LG.html, downloaded on Oct. 9, 2006.

Electronic Privacy Information Center, "Local Shared Objects—'Flash Cookies'", Jul. 21, 2005, https://epic.org/privacy/cookies/flash.html, pp. 1-3 (Year: 2005).

Felten, E. W. et al., "Timing Attacks on Web Privacy", ACM Conference on Computer and Communication Security (2000), ACM Press, pp. 25-32.

* cited by examiner

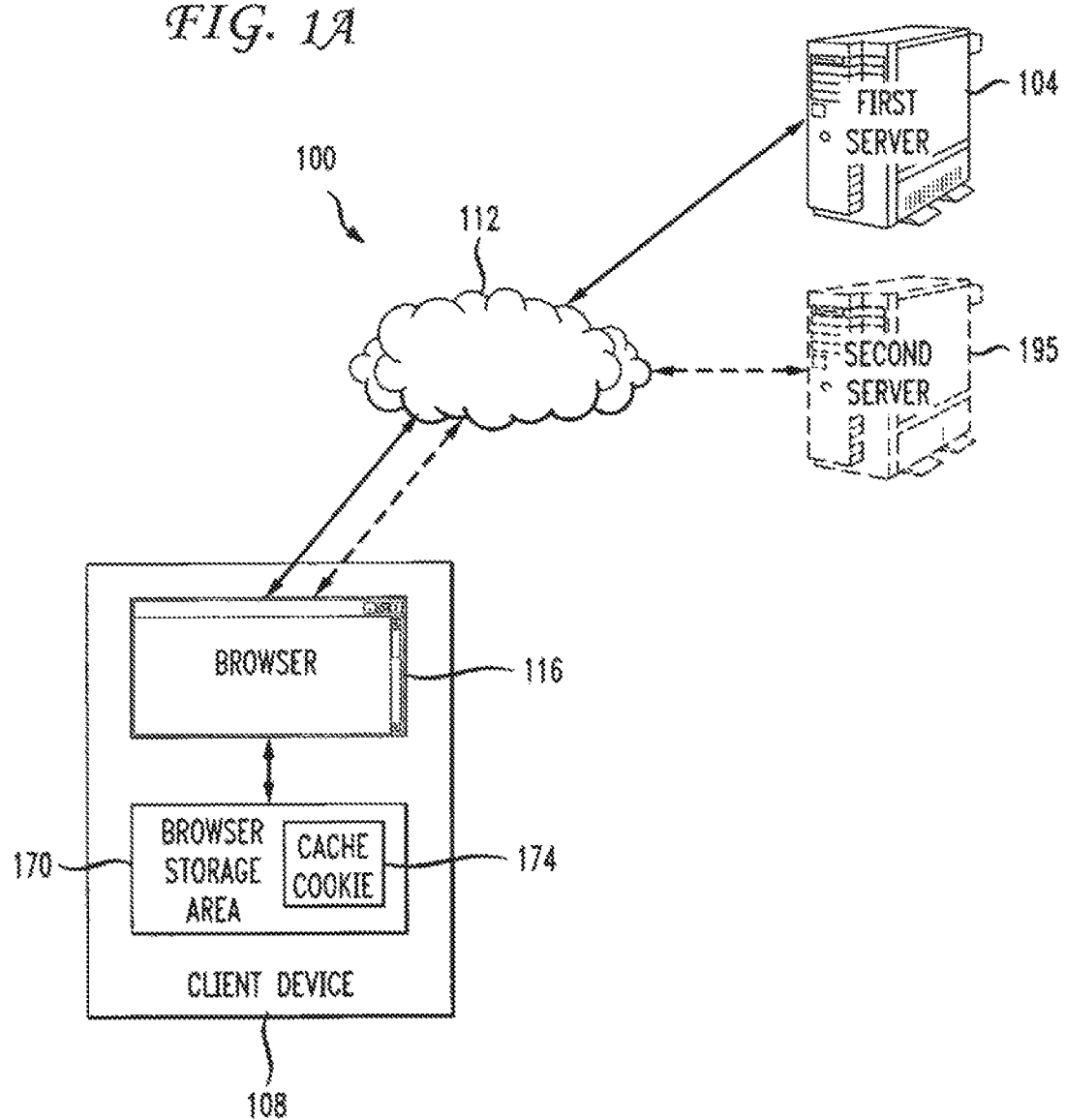

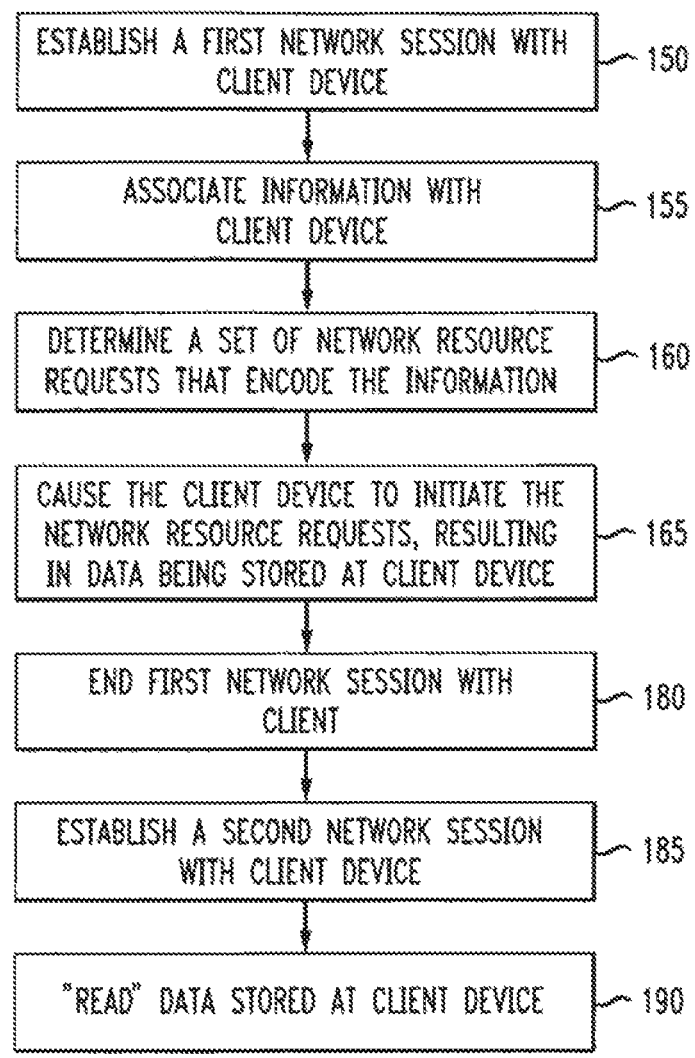

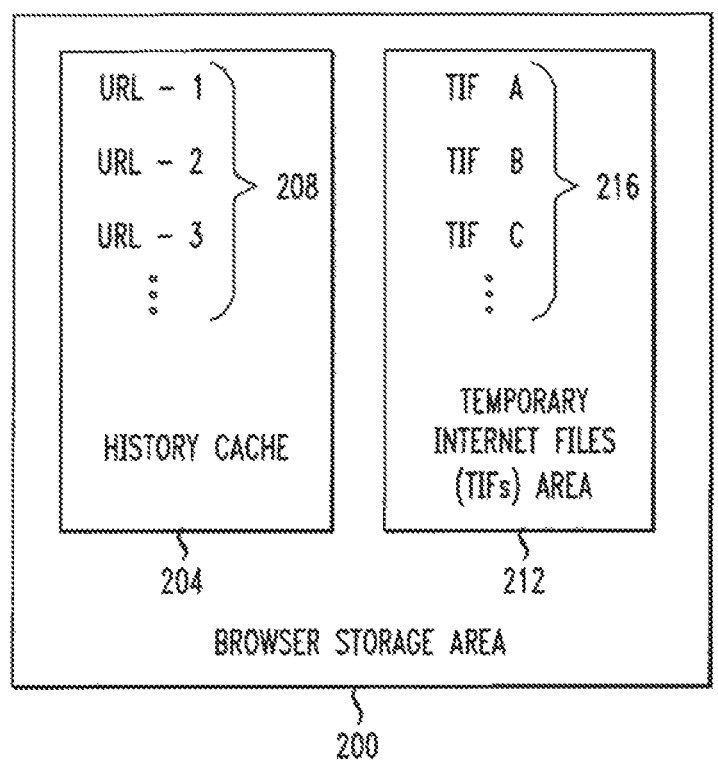

METHOD AND APPARATUS FOR STORING INFORMATION IN A BROWSER STORAGE AREA OF A CLIENT DEVICE

CROSS REFERENCE TO OTHER APPLICATIONS

This application is a continuation of co-pending U.S. patent application Ser. No. 15/706,556, entitled METHOD AND APPARATUS FOR STORING INFORMATION IN A BROWSER STORAGE AREA OF A CLIENT DEVICE filed Sep. 15, 2017, which is incorporated herein by reference in its entirety for all purposes, which is a continuation of co-pending U.S. patent application Ser. No. 14/560,906, entitled METHOD AND APPARATUS FOR STORING INFORMATION IN A BROWSER STORAGE AREA OF A CLIENT DEVICE filed Dec. 4, 2014, which is incorporated herein by reference in its entirety for all purposes, which is a continuation of U.S. patent application Ser. No. 13/964,988, entitled METHOD AND APPARATUS FOR STORING INFORMATION IN A BROWSER STORAGE AREA OF A CLIENT DEVICE filed Aug. 12, 2013, now U.S. Pat. No. 8,930,549, which is incorporated herein by reference in its entirety for all purposes, which is a continuation of U.S. patent application Ser. No. 11/590,083, entitled METHOD AND APPARATUS FOR STORING INFORMATION IN A BROWSER STORAGE AREA OF A CLIENT DEVICE filed Oct. 31, 2006, now U.S. Pat. No. 8,533,350, which is incorporated herein by reference in its entirety for all purposes, which claims the benefit of U.S. Provisional Application No. 60/732,025 filed Nov. 1, 2005, which is incorporated herein by reference in its entirety for all purposes.

BACKGROUND OF THE INVENTION

The present invention relates generally to client-server communications and more specifically to causing a browser to store information in a browser storage area of a client device.

A user typically uses a Web browser, such as Microsoft's Internet Explorer, to access a Web page over the Internet. The information needed to display the Web page via the browser is transmitted by a (Web) server over the Internet.

A Web page (e.g., associated with an e-commerce Web site or a financial institution) may request user information from the user when the user first accesses the page, such as a user's name, password, address, interests, etc. When the user accesses the same Web page at a later time, the server may use the information previously entered by the user to customize the Web page for the user.

This customization of a Web page is typically the result of cookies. A cookie is a message transmitted to a browser by a server. The message can include user-specific identifiers or personal information about the user. The browser typically stores the message in a text file. The message (i.e., cookie) is then sent back to the server each time the browser requests a Web page from the server.

For example, when Alice visits the Web site X, the server for X may transmit a cookie to Alice's computer that contains an encoding of the identifier "Alice". When Alice visits X again at a later time, her browser releases this cookie, enabling the server to identify Alice automatically. This may result in X addressing Alice by her name rather than a generic "Hello" string.

The customization of a Web page for a user often increases a user's satisfaction with a Web page and may decrease the time needed for a user to locate a particular item on the Web page. For example, the same e-commerce Web page can display different products at the top of the site for different users. The products displayed may be based on the user's interests or past behavior. This customization may shorten the time that the user needs to browse the Web page for a particular product of interest. This may increase the user's satisfaction with the Web page and, as a result, the user may return to the e-commerce Web site at a later time when the user wants to purchase something else.

Further, the identification of a user may provide security benefits. For example, a Web page does not want to display information associated with a particular user to another, different user. Cookies enable the Web page to display specific information (e.g., username, password, or home address) about a user to the user and not to other users.

Despite the benefits associated with customizing a Web page, cookies also present drawbacks. One drawback associated with cookies relates to privacy. Cookies are typically stored in a user's computer without the user's consent. Cookies are then transmitted to a Web server when the user revisits a Web site, again without the user's consent. This lack of consent may raise concerns about a user's privacy because information about a user is being stored and transmitted without the user's permission. It is also possible for servers to share information about a user that was obtained from a third-party cookie. Thus, a user's personal information, such as a user's name, interests, address, credit card number, etc. may be shared between different companies without the user consenting to this information sharing.

As a result, some people block or clear cookies. Most browsers have this ability via one or more software controls. Further, common spyware programs typically treat cookies as spyware and delete the cookies. Although a user's information can no longer be retrieved by a Web server after its cookies are removed or blocked, the Web server cannot then provide a user with a customized Web page. Organizations, such as e-commerce organizations, may lose business because a user may become dissatisfied with the user's experience on the organization's Web site. Further, financial institutions such as banks may use cookies as a way to authenticate a user. If a user blocks or clears cookies, the bank may be forced to rely on the user's username and password to identify the user. Without cookies being stored on a user's browser, the banks lose another technique to identify the user. This may result in issues when someone who is not a particular user is fraudulently acting as the user by using the particular user's username and password.

Therefore, there remains a need to identify a client device when the user (i.e., browser) accesses a Web page that the user has previously visited without many of the privacy issues associated with cookies.

BRIEF DESCRIPTION OF THE DRAWINGS

FIG. 1A is a block diagram of a communication network having a first and second server communicating with a client device in accordance with an embodiment of the present invention;

FIG. 1B is a flowchart showing the steps performed by the first (or second) server in accordance with an embodiment of the present invention;

FIG. 2 shows a high level block diagram of a browser storage area of the client device which may be used in an embodiment of the invention;

DETAILED DESCRIPTION

Figure 3:
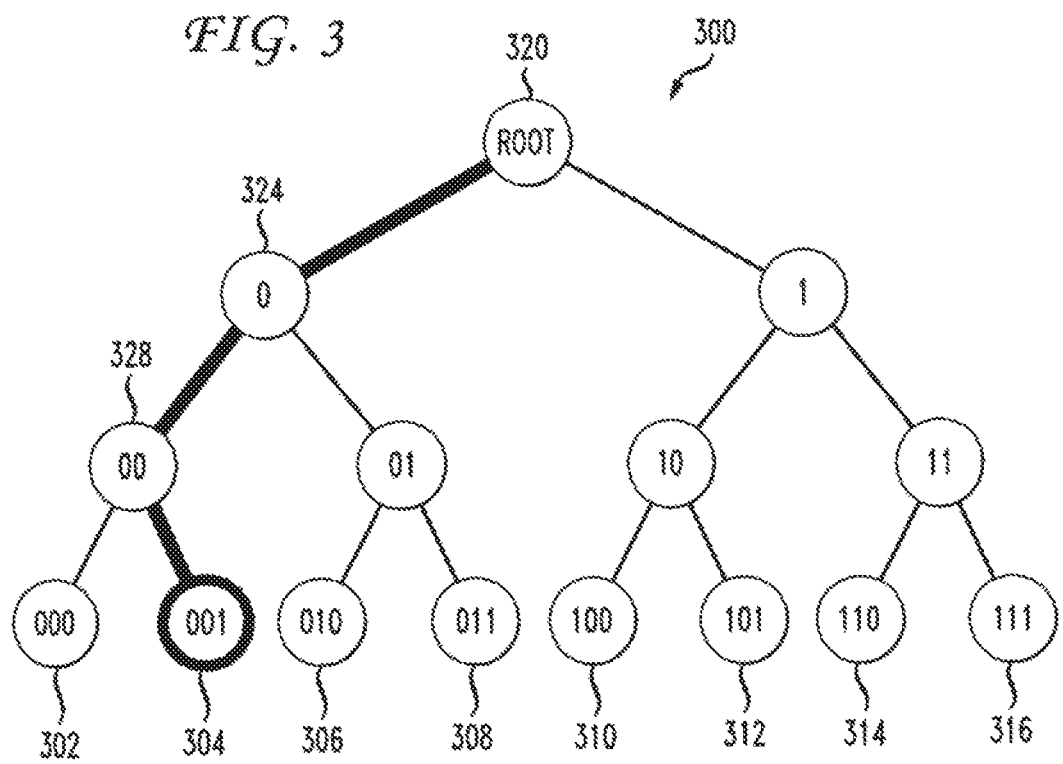
FIG. 3 shows a tree structure that may be used to identify a client device in accordance with an embodiment of the invention.

To circumvent many of the privacy issues associated with traditional cookies, one or more servers instead "write" and "read" a cache cookie to and from a browser storage area associated with a browser requesting a Web page from the server(s). The browser storage area may include a history cache and/or a Temporary Internet Files (TIFs) area.

In accordance with an aspect of the present invention, a server performs steps to cause encoded information to be stored at a client device during a first network session between the server and the client device. During a second network session between the server and the client device, the server can perform steps to determine whether the encoded information is stored at the client device. The server can use this information to identify (e.g., recognize or authenticate) a client device. The server that determines whether the encoded information is stored at the client device may be the same server or a different server than the server that causes encoded information to be stored at the client device. Further, the server(s) that perform these functions may include one or more servers.

To cause encoded information to be stored at a client device, the server first determines a set of network resource requests (zero or more network resource requests) that encode the information. These network resource requests may include requests for one or more specific URLs and/or requests for one or more files. The server then causes the client device to initiate the network resource requests. The server may cause this initiation by, for example, redirecting the client device to the network resources. The client device initiating the network resource requests causes data representative of the network resource requests to be stored at the client device.

In one embodiment, to determine the data representative of the network requests, the server transmits a sequence of messages, each message in the sequence causing zero or more network resource requests for data. The server then determines, from the zero or more network resource requests for data, the encoded information. In one embodiment, one or more servers in a plurality of servers determines a portion of the encoded information.

In another embodiment, the server causes elements associated with a graph structure to be stored. In one embodiment, the graph structure is a tree structure that includes nodes as the elements. The nodes can be stored in the browser storage area. In one embodiment, each node corresponds to a resource identifier (e.g., secret key) stored at a secret address (e.g., secret naming).

In another embodiment, a plurality of addresses are caused to be designated in the browser storage area, where each of the addresses is associated with a time epoch. A first pseudonym for a user of the client device is maintained for each time epoch. The server can then determine whether a second pseudonym exists at an address of the browser storage area. If the second pseudonym exists, the server can identify the user and cause the first pseudonym to be stored at the address in place of the second pseudonym at the expiration of the time epoch.

These and other advantages of the invention will be apparent to those of ordinary skill in the art by reference to the following detailed description and the accompanying drawings.

FIG. 1A is a block diagram of an embodiment of a communication network 100 having a first server 104 communicating with a client device 108 over a network 112 such as the Internet. FIG. 1B is a flowchart showing the steps performed by the first server 104 in accordance with an embodiment of the invention.

The client device 108 can be any device that can access another computer via network 112. Examples of a client device 108 include a desktop computer, a laptop, a personal digital assistant, a smartphone, etc. The client device 108 includes a browser 116 for downloading network resources (e.g., Web pages or files) via the network 112 (e.g., for displaying, executing, or storing on the client device 108). The browser 116 is well known in the art, for example Microsoft Internet Explorer. The connection between the client device 108 and the server 104 may be made using any well known data network communication protocol, for example the well known Hyper Text Transfer Protocol (HTTP) or HTTPS, which is a secured version of HTTP in which the payload is end-to-end encrypted. Both HTTP and HTTPS are well known for Internet communications.

The first server 104 (also referred to below as server 104) is any device or devices that can serve a network resource to the client device 108 over the network 112.

In accordance with an embodiment of the present invention, the user of the client device 108 uses its browser 116 to establish a first network session with the server 104. For example, the user uses browser 116 to request a Web page from the server 104. The server 104 establishes a first network session with the client device 108 in step 150. In one embodiment, the user provides login information (e.g., username and/or password) to the server 104 to establish the first network session.

During this first network session, the server 104 associates information with the client device 108 in step 155. The information may alternatively be associated with the user using the client device 108. The information may be one or more string, bit sequence, number, etc. In one embodiment, the server is associating the information with the client device 108 (or user) in order to identify the client device 108 (or user) at a later time. The information may be generated in any fashion (e.g., chosen from a list, randomly generated, pseudo-randomly generated, etc.).

The server 104 then determines, in step 160, a set of network resource requests that encode the information. Examples of network resource requests include specific requests for one or more Web pages or specific requests for one or more files (e.g., TIFs). The server 104 then causes the client device 108 to initiate the network resource requests in step 165.

In one embodiment, the server 104 provides the requested Web page to the client device 108. For example, the server 104 can transmit the instructions (e.g., hyper text markup language (HTML)) that the browser 116 interprets to display the requested Web page. As described in more detail below, the server 104 may cause the client device 108 to initiate the set of network resource requests by redirecting the browser 116 to the network resources via the HTML code. The client device 108 initiating the network resource requests causes data (e.g., URL name or TIF) representative of the network resource requests to be stored at the client device. As described in more detail below, this data is stored in a browser storage area 170 (e.g., browser cache).

The following is a brief background of the browser storage area 170 and how a browser typically uses its browser storage area 170. An embodiment of the structure of browser storage area 170 is described in greater detail below with respect to FIG. 2. When a browser displays a Web page for the first time, the browser typically downloads one or more files (e.g., images, text, style sheets, etc.) to its browser storage area (e.g., browser cache). The browser then uses these files to display the Web page. The stored files represent the "cached copy" of the Web page, which is local to the client device associated with the browser. The next time the browser visits the same Web page, the browser determines what is stored in its browser storage area and displays the local copy of the files rather than downloading the same files again. This often enables more efficient Web browsing for a user of the browser. For example, if the user presses the "Back" button to instruct the Web browser to load the previously loaded Web page, the previously loaded Web page typically appears almost instantly because the browser does not have to download all of the files associated with the Web page again.

Referring again to FIGS. 1A and 1B, the data stored in the browser storage area 170 that is representative of the network resource requests is referred to herein as a cache cookie 174. As described in more detail below, the cache cookie 174 is not an explicit browser feature but rather a form of persistent state in the browser 116 that the server 104 can access. Like a traditional cookie, a cache cookie 174 can be used by the server 104 to identify (e.g., recognize or authenticate) the client device 108. Unlike traditional cookies, which can be blocked or cleared (e.g., via spyware or via a browser setting to block or remove cookies), the cache cookie 174 typically cannot be blocked or cleared via spyware or a browser setting. As a result, the cache cookie 174 eliminates some of the drawbacks associated with traditional cookies described above.

The browser 116 and server 104 end the first network session (step 180). For example, the user closes the browser 116 that was displaying the requested Web page to end the first network session.

At some later point in time, the browser 116 establishes a second network session with the server 104 in step 185, for example by requesting the same Web page previously requested in the first network session. During the second network session, the server 104 "reads" the data (the cache cookie 174), for instance to identify the client device 108, in step 190. In one embodiment, the server 104 "reads" the data in step 190 by transmitting a sequence of messages to the client device 108. Each message can cause the client device 108 to make zero or more network resource requests for data to the server. The exact collection of the network resource requests indicate the data stored at the client device (in step 165). From this data, the server 104 can derive what information was encoded and stored in the client device 108.

In another embodiment, the server that indirectly "writes" the data to the client device 108 (step 165) is different than the server that "reads" the data in step 190. For example, the first server 104 may "write" the data while a second server 195 (shown with dashed lines) may "read" the data from the client device 108. Thus, the two network sessions may be created between the client device 108 and different servers (e.g., first server 104 and second server 195). Also, the two servers 104, 195 may or may not be in communication with each other. Further, the first server 104 and/or the second server 195 may each include one server or a plurality of servers. In one embodiment, the first server 104 includes a first plurality of servers and the second server 195 includes a second plurality of servers, where the first plurality of servers and the second plurality of servers have one or more servers in common.

Further, the first server may transmit a first message to the client device, the first message causing the client device to initiate a first network resource request to the second server. The first network resource request may result in the second server transmitting a second message to the client device, which may cause the client device to initiate a second network resource request (to the second server or another server). Thus, different servers may be designated to determine different portions of an identifier associated with a client device. Server roles may change dynamically, using techniques for load balancing well known in the art.

Browser Storage Area

FIG. 2 shows an embodiment of a browser storage area 200. The browser storage area 200 may include a history cache 204 that contains Uniform Resource Locators (URLs) 208 recently visited by the browser (also called browser history). The first part of the URL indicates the protocol to use, and the second part specifies the IP address or the domain name (referred to below as domain) where the network resource is located. For example, the URL http://www.server.com/page1.html identifies to the browser that the protocol is HTTP and that the requested network resource is the HTML document having the name page1.html and located at a server in the domain identified by www.server.com. The history cache 204 contains a list of URLs to which the client device has connected over some prior time period. The time period is generally adjustable by the user. As an example, the history cache 204 may store URLs visited by the browser during a period of 9 days.

A server can "write" any of a wide variety of cache cookies in the history cache 204 to, for instance, facilitate the identification of a client device (or user). One way a server can "write" to the client's history cache 204 is by redirecting the user to other URLs (within or external to the server's domain space). For example, a server operating the domain www.server.com can redirect a browser to a URL of the form "www.server.com?Z" for any desired value of Z when the browser visits www.server.com, thereby inserting "www.server.com?Z" into the history cache 204 of the client. In one embodiment, the redirection of the user's browser to another Web page (e.g., page Z) is invisible to the user. The server redirects the user's browser to another Web page (e.g., page Z) for the purpose of "writing" that URL (e.g., "www.server.com?Z") in the browser's history cache 204. The server may also redirect the browser to any number of other Web pages (with or without the user recognizing the redirection(s)). As a result, the URLs written to the history cache 204 by the server are an embodiment of the cache cookies.

At some later point in time, when the user revisits www.server.com, the server can "read" the history cache 204 of the client device to determine what Web pages the browser has recently visited. The server may recognize that the browser has visited the Web pages that the browser was previously redirected to by the server. The server can use the pattern of URLs stored in the browser's history cache 204 to, e.g., identify the client device (or user). Even if the browser is blocking cookies (or has deleted its cookies after its first visit to www.server.com), the history cache 204 still contains the cache cookies that the server can use to identify the client device (or user).

The browser storage area 200 can also include a Temporary Internet Files (TIFs) area 212 for storing TIFs 216 (e.g., TIF A, TIF B, and TIF C). TIFs are files containing information embedded in Web pages. For example, a Web page may display particular graphics (e.g., one or more icons) (e.g., .JPG file) that are downloaded by a browser when the browser requests the Web page. To speed up the display of the Web page on the browser, the browser may store these objects responsible for the graphic(s) (e.g., icons) in one or more TIFs after downloading the objects (e.g., the first time that the user visits the Web page). TIFs typically have no expiration—they persist indefinitely (as long as the browser doesn't delete a TIF to maintain its memory cap on the amount of disk space devoted to TIFs).

In order to place an object X in the TIF area 212, a server can serve content to the browser that causes the browser to download object X. A server can verify whether the browser contains object X in its browser storage area 200 by, for example, redirecting the browser to a URL that contains object X. If TIF X is not present in the browser storage area 200, then the browser requests object X from the server and downloads object X. If TIF X is present in the TIF area 212 of the browser storage area 200, the browser does not request object X from the server but instead retrieves its local copy. The server can determine whether the browser requests X or retrieves its local copy of X and can use this determination to identify the client device (or user).

For example, if a browser visits the Web page www-.server.com for the first time, the browser downloads one or more image files that are displayed as part of the Web page. The browser stores these image files as TIFs in the browser storage area 200. Further, the Web page (i.e., the server providing the Web page) may redirect (e.g., without the user's knowledge) the browser to other Web pages (e.g., in the same domain) and these other Web pages may cause the browser to download other image files. As a result, the browser may store a variety of TIFs associated with different Web pages. When the browser returns to www.server.com at a later time, the server providing the www.server.com page to the browser can determine what image files the browser is requesting (e.g., from www.server.com) and what image files the browser already has in it's local browser storage area 200 (i.e., TIF area 212). The server can use this determination (i.e., of which specific image files the browser retrieves from its local TIF area 212) to identify the browser. As a result, the TIFs stored in the TIF area 212 of a browser are an embodiment of cache cookies.

In one embodiment, the server withholds the request for X so that the server does not change the state of the cache cookie whose presence is being tested by the server. In particular and in one embodiment, if the requests made during the "read" of data are not responded to by the server 104 (i.e., the requested data is not served to the client), then the contents of the history cache or the TIF area remain the same and are not affected by the requests being made. Although this may trigger an HTTP "401" error (i.e., the response that refuses the client to get the data it requested), manipulation of the browser storage area 200 can take place in a hidden window, unperceived by the user (e.g., the requests are made in a small window, such as a 0-sized iframe).

TIF-based cache cookies can enable privacy via access-control restrictions. Browsers often reference TIFs by means of URLs. When a browser requests a TIF, therefore, the browser refers to the associated domain, not to the server that is displaying the page containing X (e.g., the image). Thus, in one embodiment, only the Web site in control of the URL corresponding to a TIF can detect the presence of that TIF in a browser storage area while another Web site cannot.

Characteristics of Cache Cookies

Although cache cookies can provide an alternative to traditional cookies, several differences exist between the two. For one and as described above, cache cookies do not get cleared when a user clears or blocks traditional cookies. Second, unlike traditional cookies, which can typically only be accessed by a server in the specified domain, cache cookies stored in the history cache can be accessed by a server in any domain. Specifically, the history-based cache cookies can only be read by another server if that server knows the names of the URLs.

As described, a cache cookie may be one or more URLs stored in the history cache 204 or one or more TIFs stored in TIF area 212. Thus, the cache cookie can be cleared when the history cache 204 or the TIF area 212 is cleared. In another embodiment, a cache cookie consists of both TIFs (stored in the TIF area 212) and URLs (stored in the history cache 204). If a cache cookie consists of both TIFs and URLs, the cache cookie can only be erased if both of these storage areas (e.g., history cache 204 and TIF area 212) are cleared.

A cache cookie may also be combined with a traditional cookie, for example to provide another layer of identification (e.g., authentication). The server can identify the client device via the traditional cookie and then authenticate the client device with the cache cookie. To clear the combination of a cache cookie with a traditional cookie, a user then has to clear or block cookies during the same interval of time that the browser storage area 200 is cleared.

With respect to the second difference between cache cookies and traditional cookies, cache cookies may be read and written by an authorized server (in any domain). A server may be authorized when the server has access to particular information about the cache cookie (e.g., that is difficult for third parties to derive).

In another embodiment, a server is authorized to read and write a cache cookie by having explicit read/write access to the cache cookie. Read/write access is given by knowledge of the names of the URLs for history based cache cookies. Write access of TIF based cache cookies is based on knowing the names of the TIFs. Read access is associated with being the domain associated with the address of the TIFs.

Cache cookies can be generated and deployed in a manner that allows for load balancing between multiple servers. For example, each of the multiple servers can read one portion of the cache cookie, and the servers are not required to communicate with each other in order for a consistent and correct reading of the portion of the cache cookie. As a result, individual packets corresponding to the cache cookie can be routed to different servers associated with the same domain, and there may be no need for coordination between the servers. In one embodiment, the servers do not know of each others' existence. Thus, a newly introduced server only needs to be known by the servers performing or directing routing of Internet traffic in order for them to be able to perform part of the task of reading the cache cookie. Once a cache cookie has been read, the identifying information can be incorporated in all consecutive communication between the user and server during the same session, without any need to read the cache cookie again during the session in question.

Graph Topology for Cache Cookies

In one embodiment, cache cookies are constructed by elements associated with a graph structure. Any graph topology can be associated with a cache cookie. For example, the graph structure can be an n*k matrix of elements or a tree-shaped graph of elements. In one embodiment, the graph structure has the format of n*2 elements, n elements and binary trees of height n.

An element of the graph structure associated with a cache cookie may be "set" if the element corresponds to the presence of some information. The element may be "not set" if the element corresponds to the absence of some information. Depending on the sequence of elements that are "set" or "not set", the server can encode any arbitrary identity or other information string. For a cache cookie corresponding to n*2 elements, the graph structure can be considered as two n-length vectors that are referred to herein as vector number 0 and vector number 1. A set position in the ith position of vector j corresponds to letting the ith position of a binary string equal j. For a structure with n elements, where n=m log 2m for some value m, the first m positions of the vector can correspond to which binary digits in an m-bit string are set to zero. Similarly, the remaining log m bits can encode the number of bits that are not set to zero. Alternatively, the vector can correspond to the binary digits in an m-bit string that are set to one, and the remaining log m bits can encode the number of bits that are not set to one. As a result, cache cookies can provide error detection.

In another embodiment, an n*1 matrix can be used with no error detection. For a cache cookie corresponding to an m-height binary tree, the identity or information to be stored can be encoded by setting all nodes on a given path, and letting the other nodes not be set. In one embodiment, the setting of all nodes on a given path is performed at the same time. Thus, more than one path may be set simultaneously. This corresponds to storing multiple pieces of information with one browser using one cache cookie. The exact path can encode the information stored, where a left path may correspond to a zero and a right path may correspond to a 1. For trees that are k-ary (each node that is not a leaf has k children), each node that is not a leaf can correspond to the storage of a k-ary number, where k=2 corresponds to the binary case. Similarly, in a matrix of size n*k, n k-ary digits can be stored. In one embodiment, some of the n k-ary digits are used for error-detection purposes.

The browser's history cache can correspond to a set of elements, where each element is a URL. An element is set if the URL is present in the browser's history cache 204, and not set if the URL is not present. Further, an element can be set in the TIF area 212 if a particular TIF is present and not set if the TIF is not present.

In one embodiment, different parts of a tree-based cache cookie can be read by different servers. Specifically, each server may read a part of a cookie by determining whether some portion of elements are set or not set. This server may further initiate a read of another part of the cache cookie. This read of another part of the cache cookie may be performed by a different server. In one embodiment, the server initiates a read of the parts that have not yet been read by communicating the parts that have been read to the user's browser. The next server can determine the parts that have been "read" and use this information to determine the parts of the cookie that still need to be "read".

Detection of Pharming Using Cache Cookies

In one embodiment, a server can use cache cookies to detect pharming. Pharming typically seeks to obtain personal or private (e.g., financial) information through domain spoofing. Pharming "poisons" a domain name server. A domain name server, or DNS server, is a server that translates domain names into IP addresses. The DNS server maintains DNS tables that have IP addresses that correspond with domain names. Pharming poisons a DNS server by infusing false information into one or more DNS tables, resulting in a user's request being redirected to an incorrect Web page. The user's browser, however, displays that the user is at the correct Web page, making pharming dangerous and often difficult to detect.

A URL can have the format www.server.com/path or 192.65.1.12/path (i.e., domain name or IP address). Some URLs can have one format, while others can have another format. If a server receives several requests for URLs, some of which are of one format while others are of the other format, then the server can verify, using cache cookies in the browser's history cache 204, that these requests are made from the same IP address if they occur during the same session. As a result, the server can detect pharming by determining inconsistencies in IP addresses for related communication. Specifically, if the DNS tables associated with a user are incorrect, then the history cache 204 may contain a URL element but not its corresponding IP address element. Additionally, responses to requests can be sent to both types of addresses (i.e., the IP address and the domain name) listed in the DNS table. If only the IP address responses are received by the server, then the DNS information available to the client device is likely to be incorrect.

General Read/Write Structure of Browser Storage Area

The browser storage area 200 can be viewed as a general read/write memory structure in the user's browser. A server can test for the presence of any cache cookie in a list of many cache cookies. In one embodiment, a server can mine cache cookies in an interactive manner (e.g., the server can refine its search as the server searches, using, for example, preliminary information to guide its detection of additional cache cookies).

As described above, a server can indirectly "write" cache cookies to the history cache 204 by redirecting a browser to URLs (within its domain space or externally). For example, a server operating the domain www.server.com can redirect a browser to a URL of the form "www.server.com?Z" for any desired value of Z, thereby inserting "www.server.com?Z" into the history cache 204. Thus, a server can create a cache cookie memory structure (e.g., within the history cache 204) over the space of URLs of the form, e.g., "www.server.com?Z", where $Z \in \{0, 1\}^{l+1}$. Thus, Z is an index into the cache cookie memory structure. The space can be very large (for example, Microsoft's Internet Explorer can support 2048-bit URL paths).

Let the predicate $P_{i,t}[r]$ denote whether the URL corresponding to a given index $r \in R$ is present in the browser storage area 200 of user i. If so, $P_i[r]=1$; otherwise $P_i[r]=0$. For clarity, time is not included in this notation.

A server interacting with user i can change any $P_i[r]$ from 0 to 1. The server can do this by planting the URL indexed by r in the browser storage area 200. To erase cache cookies, a server can assign two predicates to a given bit b. The predicates may be viewed as on-off switches. If neither switch (predicate) is on, the bit b has no assigned value. When the first switch is on and the second switch is off, b=0. If the opposite is true, then b=1. Finally, if both switches are on, then b is again unassigned—it has been "erased".

More formally, let $S=\{0,1\}^l$. A predicate $Q_i[s]$ over S can be defined for any $s \in S$. This predicate can assume a bit value, i.e., $Q_{i,t}[s] \in \{0,1\}$; otherwise, it is "blank" and $Q_i[s] = \phi$ can be written, or it is "erased", and $Q_{i,t}[s]=v$ can be written. Let $\|$ denote string concatenation. $Q_i$ can be defined as follows: Let $r_0 = P_{i,t}[s\|'0']$ and let $r_1=[s\|'1']$. If $r_0=r_1=0$, then $Q_i[s]=\phi$; if $r_0=r_1=1$, then $Q_i[s]=v$. Otherwise, $Q_i[s]=b$, where $r_b=1$. This definition yields a write-once structure M with erasure for cache cookies over the set S. When $Q_i[s]=\phi$, a server interacting with user i can write an arbitrary bit value b to $Q_i[s]$ by setting $P_{i,t}[s\|b]=1$. The server can erase a stored bit bin $Q_i[s]$ by setting $P_i[s\|1-b]=1$.

Within the structure M, an m-bit memory structure M' can be defined. M' is capable of being written c times. Suppose M' consists of a sequence of n=cm bits in M. Once the first block of m bits in M' has been written, the server re-writes M' by erasing this first block and writing to the second block. Thus, the server can write c times to M'. To read M', the server can perform a binary search, testing the leading bit of the memory blocks in M' until the server locates the current write boundary. Thus, a read requires at most $\lceil \log c \rceil$ queries.

In one embodiment, the memory structures M and M' permit random access and not search operations. Thus, when l is sufficiently large (e.g., when cache cookies are 80 bits long)—the cache cookie memory structure M can be large enough to render brute-force search by browser sniffing impractical. For example, suppose that a server plants a secret, k-bit string $x=x_0 x_1 \ldots x_k$ into a random location in the history cache 204 of user i. That is, the server selects $s \in_L 2^l - k - 1$, and sets $Q_i[s+i]=x_i$ for $1 \le i \le k$. It is likely infeasible for a second server interacting with user i to learn x—or even to detect its presence. Hidden data of this kind can be used to protect the privacy of cache cookies.

Variant Memory Structures

In other embodiments, more query-efficient encoding schemes for the cookie cache memory structures M and M' are used. For example, an m-bit block of data in M can be defined as follows. Let $\{P_i[s], P_i[s+1], \ldots, P_i[s+c]\}$ represent the memory block in question. A leading predicate $P_i[s-1]$ is pre-pended. The value $P_i[s-1]=0'$ indicates that the block is active—the block has not yet been erased. To encode the block, a server may change any predicate to a '1'. $P_i[s-1]=1'$ indicates that the block has been erased. In one embodiment, this type of erasure does not truly efface information. The information in an "erased" block remains readable. Full effacement is sometimes desirable, as in the rolling pseudonym scheme described below. In another embodiment, the value associated with a block of stored bits is represented by the XOR of the bits. Thus, a block can be rewritten m times.

Using Cache Cookies to Identify Users

Tree-Based Scheme

As described above, the server may use cache cookies to identify a user. In one embodiment, the server uses a tree-based scheme to structure user identifiers in the cache cookie memory structure.

FIG. 3 is an embodiment of a tree structure 300, referred to herein as an identifier tree 300, that the server can use to identify a user. The identifier tree 300 is a tree that has eight identifiers 302-316, one for each leaf node. The identifier tree 300 has a depth d=3 (from root node 320). The highlighted path corresponds to identifier '001' 304. To cause this identifier to be stored in a user's browser, a server "sets" the bit value in particular addresses of the cache cookie memory to '1'. When the server later performs a search of the cache cookie memory in the browser storage area, the server can determine the bits that have been set along the highlighted path, thereby leading the server to the '001' leaf 304 and the user identified by the '001' leaf 304.

For example, the server can, during a first session, "write" a first URL to node 0 324, a second URL to node 00 328, and a third URL to node 001 304. The combination of the first URL, second URL, and third URL can identify the user. During a subsequent session between the browser and the server, the server can "read" the browser storage area to determine whether the first, second, and third URLs are present.

In another embodiment, the tree-based scheme restricts cache cookie access to a site that possesses an underlying resource identifier (e.g., secret key). The identifier tree's nodes (e.g., nodes 324 and 328) correspond to secrets in the cache cookie memory. These secrets are referred to herein as secret cache cookies.

The server can plant in the browser of the user the set of secret cache cookies along the path from the root to the distinct leaf that is associated with the user. To identify a user, the server can interactively "read", or query, the user's browser to determine which path the browser storage area contains. Thus, the server performs a depth-first search of the identifier tree to identify the user. In one embodiment, the search is feasible only for the original server that generated the identifier tree (or for a delegate), because only that server knows the secret cache cookies associated with nodes in the tree. Therefore, privacy for the user identifiers is maintained.

For example, consider a binary tree T Let d denote the depth of the tree. For a given node n within the tree, let n$\|$'0' denote the left child, and n$\|$'1' denote the right child. For the root, n is a null string. For every distinct bitstring $B=b_0 b_1 \ldots b_j$ of length j, there is a unique corresponding node $n_B$ at depth j. The leaves of T are the set of nodes $n_B$ for $B \in \{0,1\}^d$.

In one embodiment, two secret values, $y_B$ and $u_B$, are associated with each node $n_B$. The first value, $y_B$, is a k-bit secret key. The second value, $u_B$, is a secret (1-bit) address in the cache cookie memory. To store node $n_B$ in the cache cookie memory of a particular browser, the server stores the secret key $y_B$ in address $u_B$. The sets of secret values $\{(y_B, u_B)\}_{B \in \{0,1\}^d}$ may be selected uniformly at random or generated pseudo-randomly from a master secret key.

The server that has generated T for its population of users assigns each user to a unique, random leaf. Suppose that user i is associated with leaf $n_B^{(i)}$, where $B^{(i)} = b_1^{(i)} b_2^{(i)} \ldots b_d^{(i)}$. In one embodiment, when the user visits the server, the server determines the leaf—and thus the identity—of the user as follows. First, the server queries the user's browser to determine whether the browser (i.e., the browser storage area) contains $n_0$ or $n_1$. In particular, the server queries address $u_0$ of the browser storage area to determine whether address $u_0$ contains secret key $y_0$. The server then queries address $u_1$ of the browser storage area to determine whether address $u_1$ contains secret key $y_1$. The server then recurses. When the server determines that node $n_B$ is present in the browser storage area, the server next determines whether the children of node $n_B$ (i.e., $n_{B\|'0'}$ or $n_{B\|'1'}$) are present. This continues until the server determines the full path of nodes and thus the leaf corresponding to the identity of user i.

For example, the server verifies whether a first or second node is stored. Based on this verification, the server then checks either whether a third or fourth node is stored (if the first node was stored) or a fifth or sixth node is stored (if the second node was stored). This way, the tree can be traversed.

In one embodiment, if the server does not know the addresses (e.g., names of TIFs or names of URLs in the history cache), then the server cannot read them. An attacker with a first identifier stored in his browser only knows a part of all addresses (e.g., the names of TIFs or URLs) and therefore would not likely be able to read the contents of another browser.

Further, the server can deploy identifier trees with any degree. For example, consider an identifier tree with degree $\delta = 2^z$, where d is a multiple of z, and the number of leaves is $L = 2^d$. The depth of such a tree, and consequently the number of stored secret cache cookies, is d/z. This correlates to the number of rounds of queries required for a depth-first search, assuming that each communication round contains the δ concurrent queries associated with the currently explored depth. Therefore, higher-degree trees induce lower storage requirements and round-complexity. On the other hand, higher-degree trees induce larger numbers of queries. Assuming δ (concurrent) queries per level of the tree, the total number of queries is $\delta d/z = 2^k d/z$.

In one embodiment, trees of higher degree can be simulated in searching a binary tree. A subtree of depth z of a tree can be compressed anywhere within a binary tree by treating all of its $2^z$ deepest nodes as children of the root node of the subtree (effectively disregarding all of its internal nodes). Depth-first search over this subtree can be replaced by a single round of $2^z$ queries over the deepest child nodes. Likewise, we can compress any set of z consecutive levels within a binary tree by treating them as a single level of degree $2^z$. Such compressed search can achieve lower round-complexity than a binary depth-first search, at the cost of more queries. For example, a binary tree of depth d=12 can be treated as a tree of degree δ=16 and d=3. A server can perform a depth-first search with four rounds of communication. In each round, the server queries the sixteen possible great-great grandchildren of the current node in the search. Compressed search within a binary tree can be quite flexible. Further, a server can adjust the degree of compression dynamically in accordance with observed network latency (e.g., high round-trip times favor high compression of tree levels, while low round-trip times may favor low compression). The identifier tree may also be used to identify multiple users (e.g., of a single browser) and may help in the management of shared browsers.

In one embodiment, the server includes a cryptographic checksum on each identifier associated with the browser (embedded in a secret, user-specific address in cache cookie memory). The checksum may be embedded in a browser-specific manner. For example, the checksum can be computed over all valid identifiers in the browser. If the server refreshes its identifiers simultaneously, this checksum does not go stale as a result of a subset of identifiers dropping from the cache. The checksum can therefore be used to eliminate spurious identifiers (e.g., inserted by a malicious server).

Rolling-Pseudonym Scheme

Another approach to protecting user identifiers is to treat them as pseudonyms and change them (e.g., periodically). The server designates a series of k-bit cache cookie memory addresses $v_1, v_2, \ldots$, where $v_j$ is associated with time epoch j. The server additionally maintains for each user i and each time epoch j a k-bit pseudonym $\pi_j^{(i)}$.

In one embodiment, whenever the server has contact with the browser of a given user, the server searches sequentially backward over p positions $v_j, v_{j+1}, \ldots, v_{j-p+1}$ until the server locates a pseudonym $\pi_j'$ in position $v_j$ and identifies the user, or determines that no pseudonyms are present within its search window. On identifying the user, the server implants the current pseudonym $\pi_j^{(i)}$ in address $v_j$.

In one embodiment, the server erases the contents of memory addresses $v_j, v_{j+1}, \ldots, v_{j-1}$. Otherwise, memory addresses associated with epochs in which the user has not communicated with the server may be blank. These blanks may reveal information to a potential adversary about the visitation history of the user—each blank indicates an epoch in which the user did not contact the server.

Additionally, the parameter p may be large enough to recognize infrequent users. In one embodiment, a server can check whether a memory address has been previously accessed by reading its leading bit. The server can therefore check hundreds of epochs. If an epoch is three days, for example, then a server may be able to scan years worth of memory addresses, and therefore the full lifetime of any ordinary browser (and well beyond the lifetime of certain cache-cookies, like those for browser history).

In one embodiment, the server uses a master key x to generate pseudonyms as ciphertexts. If $e_x[m]$ represents a symmetric-key encryption of message m under key x, then the server may compute $\pi_j^{(i)} = e_x[i||j]$. The server can decrypt a pseudonym to obtain the user identifier i. In one embodiment, the rolling pseudonyms are deployed using cache cookie memory based on cache cookies that expire (like those for browser histories).

Using Cache Cookies to Authenticate User

As described above, cache cookies can also be used to authenticate a user, for example, after a server uses traditional cookies to identify a user. Authenticating a user is the confirming of the user's identity and occurs after the user has been identified. Cache cookies have privacy-enhancing strengths, such as resistance to pharming, which facilitate authentication of a user.

Some vendors use traditional cookies as authenticators to supplement user passwords. Because traditional cookies (and other sharable objects) are fully accessible by the domain that set them, they are typically vulnerable to pharming. As described above, pharming occurs when a browser directed to a Web server legitimately associated with a particular domain instead connects to a spoofed site. A pharmer can then access the traditional cookies associated with the attacked domain. Thus, pharming can undermine the use of cookies as supplementary authenticators.

Secret cache cookies offer resistance to pharming. As described above in the identifier-tree scheme, a secret cache cookie is a secret, k-bit key $y_i$ specific to user i that is stored in a secret, user-specific address $u_i$ (in cache cookie memory). In one embodiment, the server associates a series of secret cache cookies to a user.

To authenticate a user after a user identifies herself (and, in one embodiment, after a user authenticates herself using other means), a server can check for the presence of the user-specific secret cache cookie $y_i$ (or cookies) as an authenticator. Secret cache cookies are resistant to pharming because, in order to access the key $y_i$, a server has to know the secret address $u_1$ associated with a user.

In one embodiment, cache cookies can be rewritten by the server if they are erased by the user of the client device. For example, the server may "write" a first cache cookie in the history cache and a second cache cookie that encodes the same or a different value as the first cache cookie in the TIF area. The user may then erase one of the cache cookies. When the client device revisits the server, the server can determine the user's identity from the cache cookie that was not erased and can subsequently rewrite the previously erased cache cookie again. Further, the server may implement this technique in addition to using traditional cookies. Thus, if any of the cache cookies or traditional cookies are erased, the server can rewrite them when the client revisits the server.

Computer Implementation

Figure 4:
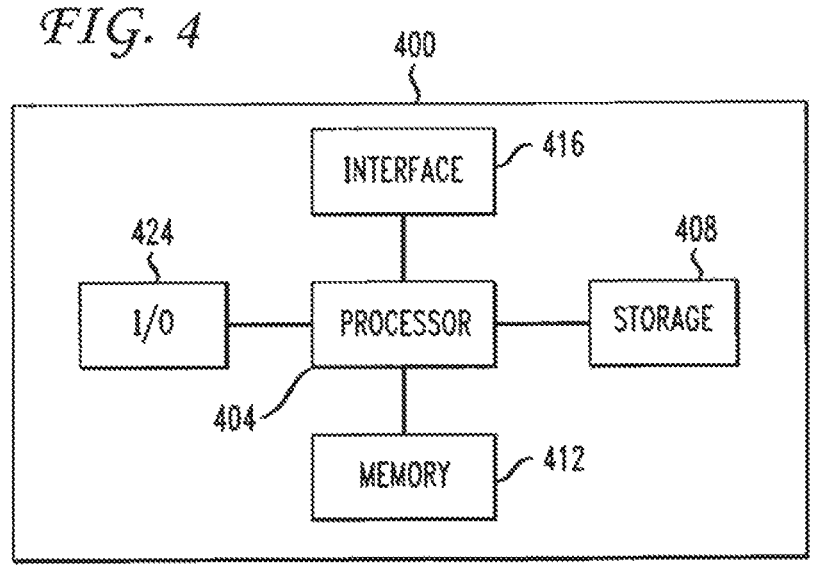
FIG. 4 shows a high level block diagram of a computer system which may be used in an embodiment of the invention.

The previous description describes the present invention in terms of the processing steps required to implement an embodiment of the invention. These steps may be performed by an appropriately programmed server computer, the configuration of which is well known in the art. An appropriate server computer may be implemented, for example, using well known computer processors, memory units, storage devices, computer software, and other nodes. A high level block diagram of such a server computer is shown in FIG. 4. Server computer 400 contains a processor 404 which controls the overall operation of computer 400 by executing computer program instructions which define such operation. The computer program instructions may be stored in a storage device 408 (e.g., magnetic disk) and loaded into memory 412 when execution of the computer program instructions is desired. Server computer 400 also includes one or more interfaces 416 for communicating with other devices (e.g., locally or via a network). Server computer 400 also includes input/output 424 which represents devices which allow for user interaction with the computer 400 (e.g., display, keyboard, mouse, speakers, buttons, etc.).

One skilled in the art will recognize that an implementation of an actual computer will contain other nodes as well, and that FIG. 4 is a high level representation of some of the nodes of such a server computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method, comprising:
  receiving, at a set of servers, a request for content, from a first client;
  determining, by the set of servers, information including a network resource, wherein the determined information is associated with at least one of the first client and a user associated with the first client;
  sending, by the set of servers to the first client, a web page element that includes a reference to the network resource, wherein, in response to loading the web page element, the first client initiates a first request for the network resource, and wherein initiating the first request for the network resource causes data representative of the network resource to be stored in a browser storage area of the first client;
  receiving, at the set of servers, a second request for the network resource; and
  in response to receiving the second request for the network resource, identifying, by the set of servers, the first client, at least in part by determining that the data representative of the network resource is stored in the browser storage area of the first client, and serving information associated with the network resource to the first client.

2. The method of claim 1 wherein the network resource is expressed at least in part as a Uniform Resource Locator (URL).

3. The method of claim 1 wherein the network resource is associated, at least in part, with a Temporary Internet File.

4. The method of claim 1 wherein the set of servers comprises a plurality of servers.

5. The method of claim 1 further comprising transmitting, by a first server in the set of servers, a first message to the first client, wherein the first message causes the first client to send the request to a second server in the set of servers.

6. The method of claim 1 wherein a set of instructions is transmitted from the set of servers to the first client, and wherein the set of instructions is evaluated by a browser associated with the browser storage area of the first client.

7. The method of claim 1 wherein at least one image is transmitted from the set of servers to the first client, and wherein the image is stored in the browser storage area of the first client.

8. The method of claim 1 further comprising causing at least one resource identifier to be stored in the browser storage area of the first client.

9. The method of claim 1 wherein identifying the first client comprises identifying the user associated with the first client.

10. The method of claim 9 further comprising authenticating at least one of the first client and the user associated with the first client.

11. A system, comprising:
  one or more processors configured to:
    receive, at a set of servers, a request for content, from a first client;
    determine, by the set of servers, information including a network resource, wherein the determined information is associated with at least one of the first client and a user associated with the first client;
    send, by the set of servers to the first client, a web page element that includes a reference to the network resource, wherein, in response to loading the web page element, the first client initiates a first request for the network resource, and wherein initiating the first request for the network resource causes data representative of the network resource to be stored in a browser storage area of the first client;
    receive, at the set of servers, a second request for the network resource; and
    in response to receiving the second request for the network resource, identify, by the set of servers, the first client, at least in part by determining that the data representative of the network resource is stored in the browser storage area of the first client, and serve information associated with the network resource to the first client; and
  a memory coupled to the one or more processors and configured to provide the one or more processors with instructions.

12. The system recited in claim 11 wherein the network resource is expressed at least in part as a Uniform Resource Locator (URL).

13. The system recited in claim 11 wherein the network resource is associated, at least in part, with a Temporary Internet File.

14. The system recited in claim 11 wherein the set of servers comprises a plurality of servers.

15. The system recited in claim 11 wherein the one or more processors are further configured to transmit, by a first server in the set of servers, a first message to the first client, wherein the first message causes the first client to send the request to a second server in the set of servers.

16. The system recited in claim 11 wherein a set of instructions is transmitted from the set of servers to the first client, and wherein the set of instructions is evaluated by a browser associated with the browser storage area of the first client.

17. The system recited in claim 11 wherein at least one image is transmitted from the set of servers to the first client, and wherein the image is stored in the browser storage area of the first client.

18. The system recited in claim 11 wherein the one or more processors are further configured to cause at least one resource identifier to be stored in the browser storage area of the first client.

19. The system recited in claim 11 wherein identifying the first client comprises identifying the user associated with the first client.

20. The system recited in claim 19 wherein the one or more processors are further configured to authenticate at least one of the first client and the user associated with the first client.

21. A computer program product embodied in a non-transitory computer readable storage medium comprising computer instructions for:

receiving, at a set of servers, a request for content, from a first client;

determining, by the set of servers, information including a network resource, wherein the determined information is associated with at least one of the first client and a user associated with the first client;

sending, by the set of servers to the first client, a web page element that includes a reference to the network resource, wherein, in response to loading the web page element, the first client initiates a first request for the network resource, and wherein initiating the first request for the network resource causes data representative of the network resource to be stored in a browser storage area of the first client;

receiving, at the set of servers, a second request for the network resource; and in response to receiving the second request for the network resource, identifying, by the set of servers, the first client, at least in part by determining that the data representative of the network resource is stored in the browser storage area of the first client, and serving information associated with the network resource to the first client.

\* \* \* \* \*

UNITED STATES PATENT AND TRADEMARK OFFICE
CERTIFICATE OF CORRECTION

PATENT NO. : 11,064,054 B1
APPLICATION NO. : 16/777681
DATED : July 13, 2021
INVENTOR(S) : Bjorn Markus Jakobsson and Ari Juels It is certified that error appears in the above-identified patent and that said Letters Patent is hereby corrected as shown below:

In the Specification

In Column 12, Line(s) 19, after "T", insert --.--.

In Column 12, Line(s) 49 & 50, after "path of nodes", insert -- $n_{b_1^{(i)}}, n_{b_1^{(i)}b_2^{(i)}}, \ldots, n_{b_1^{(i)}b_2^{(i)},\ldots,b_d^{(i)}}$ --, therefor.

In Column 13, Line(s) 53, delete "$V_j, V_{j+1}, \ldots, V_{j-p+1}$" and insert --$V_j, V_{j-1}, \ldots, V_{j-p+1}$--, therefor.

In the Claims

In Column 15, Line(s) 65, Claim 2, after "claim 1", insert --,--.

In Column 16, Line(s) 1, Claim 3, after "claim 1", insert --,--.

In Column 16, Line(s) 3, Claim 4, after "claim 1", insert --,--.

In Column 16, Line(s) 5, Claim 5, after "claim 1", insert --,--.

In Column 16, Line(s) 9, Claim 6, after "claim 1", insert --,--.

In Column 16, Line(s) 13, Claim 7, after "claim 1", insert --,--.

In Column 16, Line(s) 17, Claim 8, after "claim 1", insert --,--.

In Column 16, Line(s) 21, Claim 9, after "claim 1", insert --,--.

In Column 16, Line(s) 24, Claim 10, after "claim 9", insert --,--.

In Column 16, Line(s) 55, Claim 12, after "claim 11", insert --,--.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,064,054 B1

In Column 16, Line(s) 58, Claim 13, after "claim 11", insert --,--.

In Column 16, Line(s) 61, Claim 14, after "claim 11", insert --,--.

In Column 16, Line(s) 63, Claim 15, after "claim 11", insert --,--.

In Column 17, Line(s) 1, Claim 16, after "claim 11", insert --,--.

In Column 17, Line(s) 6, Claim 17, after "claim 11", insert --,--.

In Column 17, Line(s) 10, Claim 18, after "claim 11", insert --,--.

In Column 17, Line(s) 14, Claim 19, after "claim 11", insert --,--.

In Column 17, Line(s) 17, Claim 20, after "claim 19", insert --,--.